(12) United States Patent
Ademmer et al.

(10) Patent No.: US 6,212,643 B1
(45) Date of Patent: Apr. 3, 2001

(54) HIGH-SPEED CONNECTION METHOD

(75) Inventors: Heinz Ademmer, Geseke; Ulrich Pielsticker, Paderborn, both of (DE)

(73) Assignee: Siemens Nixdorf Informationssysteme Aktiengesellschaft, Paderborn (DE)

( * ) Notice: Subject to any disclaimer, the term of this patent is extended or adjusted under 35 U.S.C. 154(b) by 0 days.

(21) Appl. No.: 09/068,351

(22) PCT Filed: Nov. 6, 1996

(86) PCT No.: PCT/DE96/02115

§ 371 Date: May 7, 1998

§ 102(e) Date: May 7, 1998

(87) PCT Pub. No.: WO97/17645

PCT Pub. Date: May 15, 1997

(30) Foreign Application Priority Data

Nov. 8, 1995 (DE) ................................. 195 41 651

(51) Int. Cl.[7] ............................................ G06F 1/00
(52) U.S. Cl. ................... 713/324; 713/1; 713/2; 713/100; 713/310; 710/8; 710/10
(58) Field of Search ........................... 713/300, 310, 713/320, 321, 322, 323, 324, 330, 340, 1, 2, 100; 710/8, 10, 102, 103

(56) References Cited

U.S. PATENT DOCUMENTS

| 4,683,568 | * | 7/1987 | Urban ................................. 371/12 |
| 5,155,856 | * | 10/1992 | Bock et al. ........................ 395/800 |
| 5,410,713 | * | 4/1995 | White et al. ...................... 395/750 |
| 5,504,910 | * | 4/1996 | Wisor et al. ..................... 395/750 |
| 5,564,015 | * | 10/1996 | Bunnell ......................... 395/184.01 |
| 5,696,897 | * | 12/1997 | Dong ............................. 395/182.13 |
| 5,768,585 | * | 6/1998 | Tetrick et al. ................... 395/652 |

FOREIGN PATENT DOCUMENTS

| 41 12 334 | 10/1992 | (DE) . |
| 0 356 538 | 3/1990 | (EP) . |
| 0 666 525 | 8/1995 | (EP) . |
| WO 85/02475 | 6/1985 | (WO) . |

* cited by examiner

*Primary Examiner*—Ayaz R. Sheikh
*Assistant Examiner*—Tim Vo
(74) *Attorney, Agent, or Firm*—Schiff Hardin & Waite

(57) ABSTRACT

Energy-saving operating method, in which the disconnecting device records in a nonvolatile memory that temporary disconnection occurred, and thereupon does not execute test and diagnostic routines upon reactivation or does so to a reduced extent.

16 Claims, 1 Drawing Sheet

HIGH-SPEED CONNECTION METHOD

BACKGROUND OF THE INVENTION

1. Field of the Invention

The present method relates to the temporary disconnection of devices for the purpose of saving power.

2. Description of the Related Art

In the services sectors, data processing devices are increasingly being used in order to be able to serve customers even at times when there is little traffic, without people being employed for this purpose. Since the devices are only seldom used, it is desirable to disconnect the devices until a customer would like to carry out an operation.

However, this persistently fails because the initialization phase of a computer-controlled device can last for several minutes and the customer should not be expected to wait for this period of time. For this reason, devices are known in which the current consumption is reduced by means of special structural measures. Thus, screens are known which, in the absence of a sync signal, not only blank the picture but also, for example, disconnect the beam deflection, which makes up the vast majority of the power consumption. Also known are central processing units of personal computers which reduce the clock frequency of the computer core and switch the mass memory off.

What is common to all these solutions, however, is that it is necessary to configure or reactivate the device in order that, for example, the reactivation of the beam deflection or the increase in the clock frequency to operational levels does not have any disturbing effects.

SUMMARY OF THE INVENTION

An object of the present invention therefore, is to modify an existing computer-controlled device with little outlay in such a way that it can be reactivated quickly.

The invention makes use of the insight that most of the activation time is frequently required for test and diagnostic routines which are so lengthy because they have no information regarding the duration of the preceding switched-off phase and the point in time of the last diagnosis and therefore have to proceed from the worst-case conditions for the purpose of operationally reliable behavior.

The solution for a device which is operated interconnected with a plurality of other devices is that one of the devices in the interconnection remaining constantly active and effects the disconnection of the other devices. Before the respective device is disconnected, it is informed that the disconnection is for the purpose of saving energy. This information is recorded by the device in a nonvolatile memory, which is often already present in the device for holding configuration data, for example as a CMOS-RAM, and results in the test and diagnostic routines carrying out a significantly shortened test upon reactivation.

What is involved, then, is an energy-saving operating method in which the disconnecting device records in a nonvolatile memory that a temporary disconnection occurred, and thereupon does not execute test and diagnostic routines upon reactivation or does so to a reduced extent.

DETAILED DESCRIPTION OF THE INVENTION

Figure 1:
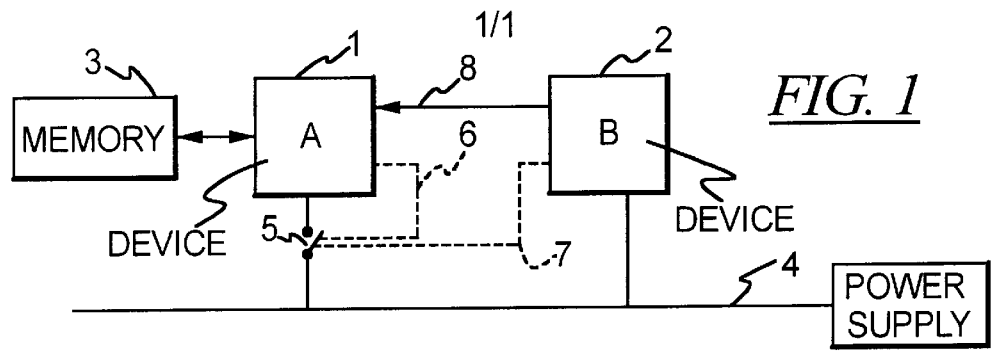
FIG. 1 shows a block diagram for an arrangement of two devices A and B.

FIG. 1 shows two devices 1 and 2 which are designated by A and B and are connected to one another by a communications link 8. Both devices are connected to a collective power supply 4. By means of a switch 5, the device 1 can be switched on and off with regard to the power supply 4 via the link 6 from the device 1 and via the link 7 from the device 2. A nonvolatile memory 3 is furthermore connected to the device 1.

Figure 2:
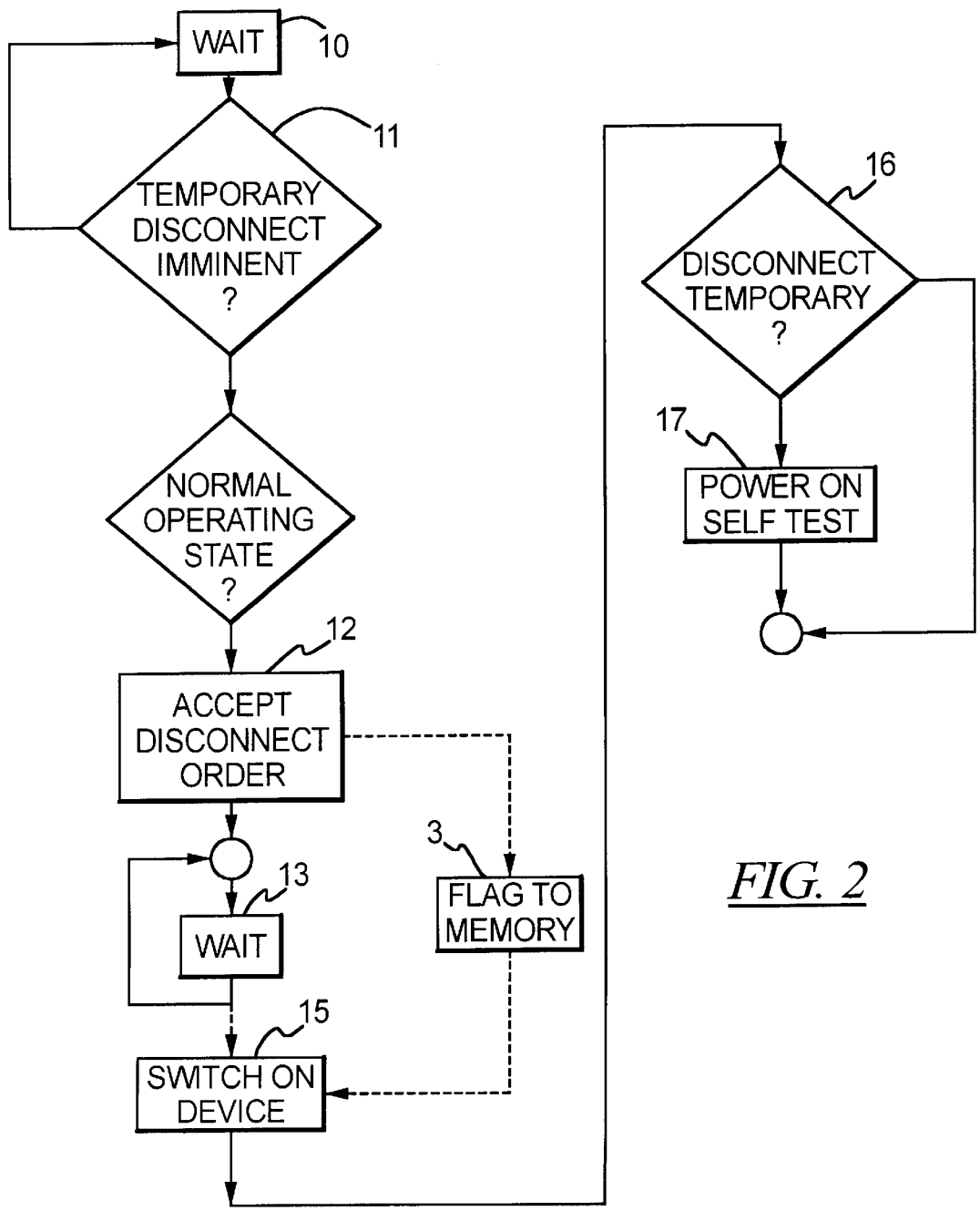
FIG. 2 shows a flow diagram for the device A.

FIG. 2 shows the sequence of temporary disconnection in device 1. In step 10, the device 1 waits for events. In step 11, it is determined whether a message that temporary disconnection is imminent has arrived from the device 2. If this message arrives, then the sequence continues with step 12. To that end, a check is firstly made to see whether the device is in the normal operating state. This step is not illustrated in FIG. 2 for the sake of clarity. Specifically, if an operating state which, although it can be corrected, is nevertheless not normal has been identified during the activation diagnoses in the case of the previous activation, the device will reject the order for temporary disconnection.

In the normal case, however, the order is accepted and is recorded in the nonvolatile memory 3. Step 13 is a waiting loop in which either there is a wait for disconnection by the device 2 via the link 7 or this command is effected via the link 6 itself. The device is then in a switched-off state, indicated by the dotted arrow. Device 2 remains operationally available and recognizes that the device 1 might be required from an external event, for example a light barrier (not shown) which indicates the approach of a potential user, or an input on a keyboard (not shown). The device 2 therefore switches the device 1 on via the link 7, at step 15. Immediately after being switched on, the device 1 begins a test routine which is always run through upon activation and tests the basic functions and extracts operating parameters from the nonvolatile memory 3. This operation is also referred to as POST, "Power On Self Test". In step 16, it is determined whether the data in the nonvolatile memory 3 contain a flag indicating that temporary disconnection occurred. If this flag is present, then those parts of the POST which are designated symbolically by step 17 are not executed. These include comprehensive tests of the functions of the device 1 which have proven to be useful particularly after a relatively long operating intermission. These include, for example, memory tests with different patterns in order to discover instances of data locking. These tests are unnecessary after temporary disconnection. Furthermore, these tests may be ones which test the interaction of a plurality of components. Such a test is practical particularly when components have been replaced due to repair. Furthermore, an extensive test of the consistency of the parameters stored in the nonvolatile memory, in particular of whether there is agreement with the installed components, can be omitted after a temporary disconnection.

By virtue of this measure, it is possible, for example, to reduce the time between activation of a device and operational availability thereof from 60 sec to 15 sec. It should be taken into account here that a time of 15 sec is perfectly well tolerated by a customer at an automatic goods or services machine, whereas a waiting time of 60 sec leads in many cases to dissatisfaction at the very least.

An alternative implementation of the invention can be employed when the device 1 is aware of the state of the operating intermission; for example when a printer has completed the page and has no further data in the buffer. In such a case the printer, provided that it has a clock, can regularly write the time to the nonvolatile memory together with a flag indicating that an operating intermission is present.

Should it resume processing as a result of new data, this record in the nonvolatile memory is erased. In any event, the printer can be disconnected during the phase of inactivity. If printing is to be carried out, then the printer is reactivated. In the activation test routines, a check is then made to see whether the flag is set and the time of disconnection is below a predetermined limit of, for example, 6 hours. If this is the case, then a reduced POST can be carried out and the time until operational availability can thus be reduced. A message from the device effecting the disconnection is then not required.

In the case of a printer, a special interface module is expediently provided as the device 2, which controls the interface of the printer in such a way that it can receive one or a few characters, buffers the latter and immediately signals to the sending device that the buffer is full, and furthermore activates the rest of the printer, which constitutes the device 1. If this is operationally available, this time being particularly short if temporary disconnection occurred, then it can fetch the data from the interface and afterwards, at full speed, fill its own buffer, which is usually considerably larger, and, if appropriate, begin the print-out.

The operating method in both variants can, therefore, also perfectly well be employed when the "devices" are not units separated by different housings, but modules within a single housing, provided that the module to be temporarily disconnected executes an extensive self-diagnosis when the operating voltage is switched on, and can access a nonvolatile memory.

Although other modifications and changes may be suggested by those skilled in the art, it is the intention of the inventor to embody within the patent warranted hereon all changes and modifications as reasonably and properly come within the scope of his contribution to the art.

What is claimed is:

1. An energy-saving operating method for a first device which can be switched on and off electronically, and carries out test routines after activation, comprising the steps of:
   providing a nonvolatile memory accessable by said first device;
   providing a second device connected to be capable of switching on said first device;
   sending a message from the second device to the first device that an imminent disconnection of the first device is a temporary disconnection;
   storing information that the imminent disconnection of the first device is a temporary disconnection in the nonvolatile memory;
   disconnecting a voltage supply of the first device;
   the second device effecting reactivation of the first device on a basis of a predetermined event;
   shortening an initialization phase for reactivating the first device based on the information stored in the nonvolatile memory that a temporary disconnection occurred.

2. A method as claimed in claim 1, wherein said first device is a modular part of a larger device.

3. A method as claimed in claim 1, wherein said predetermined event is a period of time having elapsed.

4. A method as claimed in claim 1, wherein said predetermined event is an external event.

5. A method as claimed in claim 1, wherein said shortening an initialization phase for reactivating the first device bypasses execution of test routines serving to check functionality of individual components.

6. A method as claimed in claim 1, wherein said shortening an initialization phase for reactivating the first device executes test routines serving to check functionality of individual components to a reduced extent.

7. A method as claimed in claim 1, wherein said shortening an initialization phase for reactivating the first device bypasses execution of test routines serving to check stored configuration data.

8. A method as claimed in claim 1, wherein said shortening an initialization phase for reactivating the first device executes test routines serving to check stored configuration data to a reduced extent.

9. An energy-saving operating method as claimed in claim 1, wherein said disconnecting step is performed by said first device.

10. An energy-saving operating method as claimed in claim 1, wherein said disconnecting step is performed by said second device.

11. An energy-saving operating method as claimed in claim 9, wherein said first device performs an operation check prior to said disconnecting step and performs said disconnecting step only if said operation check determines a normal operating state.

12. An energy-saving operating method for a device which can be switched on and off electronically, and which carries out test routines after activation, comprising the steps of:
    providing a nonvolatile memory accessible by the device;
    providing a clock which is independent of a power supply for the device;
    if the device is in an operating intermission, storing information regarding the operating intermission at regular intervals together with a time detail from the clock in the nonvolatile memory,
    if the device leaves an operating intermission, erasing the stored time information;
    after activation, checking to see whether the nonvolatile memory contains a valid time detail which is not out of date compared with a predetermined limit, and, if within the predetermined limit shortening an initialization of the device.

13. A method as claimed in claim 12, wherein the shortening an initialization of the device bypasses execution of test routines serving to check the functionality of individual components.

14. A method as claimed in claim 12, wherein the shortening an initialization of the device executes test routines serving to check the functionality of individual components to a reduced extent.

15. A method as claimed in claim 12, wherein the shortening an initialization of the device bypasses execution of test routines serving to check stored configuration data.

16. A method as claimed in claim 12, wherein the shortening an initialization of the device executes test routines serving to check stored configuration data to a reduced extent.

* * * * *